United States Patent [19]

Spaulding, II

[11] Patent Number: 5,668,592

[45] Date of Patent: Sep. 16, 1997

[54] INTERACTIVE TELEVISION TERMINAL RESPONSIVE TO USER COMMANDS WHICH COMBINES STATIC SERVICE DATA AND RECURRENTLY BROADCAST DYNAMIC SERVICE DATA TO PRODUCE COMPOSITE SERVICE DISPLAY SIGNALS

[75] Inventor: John E. Spaulding, II, N. Miami, Fla.

[73] Assignee: Interaxx Television Network, Inc., Miami, Fla.

[21] Appl. No.: 224,639

[22] Filed: Apr. 6, 1994

[51] Int. Cl.$^6$ .................... H04N 7/14; H04N 7/10
[52] U.S. Cl. .................... 348/13; 348/10; 348/12; 455/5.1; 455/6.2
[58] Field of Search .................... 348/1, 2, 3, 6, 348/7, 10, 12, 13; 455/2, 3.1, 5.1, 6.1, 6.2, 6.3; H04N 7/16, 7/169, 7/173, 7/10, 7/14

[56] References Cited

U.S. PATENT DOCUMENTS

| | | | |
|---|---|---|---|
| 4,303,937 | 12/1981 | Cook | 358/86 |
| 4,575,750 | 3/1986 | Callahan | 358/86 |
| 4,750,036 | 6/1988 | Martinez | 358/147 |
| 4,792,849 | 12/1988 | McCalley et al. | 358/86 |
| 4,802,022 | 1/1989 | Harada | 358/349 |
| 4,829,372 | 5/1989 | McCalley et al. | 358/86 |
| 4,905,094 | 2/1990 | Pocock et al. | 358/342 |
| 5,014,125 | 5/1991 | Pocock et al. | 348/7 |
| 5,057,915 | 10/1991 | Von Kohorn | 358/84 |
| 5,077,607 | 12/1991 | Johnson et al. | 358/86 |
| 5,093,718 | 3/1992 | Hoarty et al. | 358/84 |
| 5,142,576 | 8/1992 | Nadan | 380/20 |
| 5,181,107 | 1/1993 | Rhoades | 358/86 |
| 5,187,735 | 2/1993 | Garcia et al. | 379/88 |
| 5,192,999 | 3/1993 | Graczyk et al. | 358/85 |
| 5,260,778 | 11/1993 | Kauffman et al. | 358/86 |
| 5,262,860 | 11/1993 | Fitzpatrick et al. | 358/142 |
| 5,283,638 | 2/1994 | Engberg et al. | 348/14 |
| 5,357,276 | 10/1994 | Banker et al. | 348/7 |
| 5,583,560 | 12/1996 | Florin et al. | 348/12 X |

*Primary Examiner*—John K. Peng
*Assistant Examiner*—John W. Miller
*Attorney, Agent, or Firm*—Morgan, Lewis and Bockius, LLP

[57] ABSTRACT

In an interactive TV system, information which can be left relatively unchanged for substantial periods of time is stored in CD-ROM at each subscriber site. Information which changes between CD-ROM replacements is transmitted from the head end to the subscriber sites in a recurring, or recycling data stream. Individual subscriber sites select the information they desire from the data stream and reproduce it, together with any related information stored in CD-ROM. Transactions based on the so-reproduced information are activated by telephone line transmissions from the subscriber sites.

33 Claims, 3 Drawing Sheets

INTERACTIVE TELEVISION TERMINAL RESPONSIVE TO USER COMMANDS WHICH COMBINES STATIC SERVICE DATA AND RECURRENTLY BROADCAST DYNAMIC SERVICE DATA TO PRODUCE COMPOSITE SERVICE DISPLAY SIGNALS

BACKGROUND OF THE INVENTION

The present invention relates to so-called "interactive" television. This subject has recently attracted much attention and has given rise to high expectations as to the many services which it would provide.

In practice, however, these expectations have heretofore not been fulfilled.

It has been thought that very costly cable networks using advanced fiber optics might be required. Alternatively, the variety of services might be limited. Or the caliber of these services might be relatively primitive.

SUMMARY OF THE INVENTION

Accordingly, it is an object of the present invention to provide interactive television in a manner which overcomes one or more inadequacies of prior proposals.

It is another object of the invention to provide interactive television in a manner which does not require fiber optic networks.

It is still another object to provide interactive television which provides an adequate variety of services.

It is still another object to provide interactive television which provides high-caliber services.

These and other objects which will appear are achieved in accordance with the present invention as follows.

There is provided an overall, integrated system, which includes a central source at which signals for use by the system originate (e.g. the head end of a cable TV network), and a plurality of sites which interactively utilize these signals (e.g., the equipment at the location of the various individual subscribers of the network).

At the central signal source there are produced those signals which are conventionally provided by a cable TV network, namely the signals which reproduce, on conventional TV receivers, the pictures and sounds of conventional TV programming. These signals are then transmitted to the sites of the cable TV subscribers over the various conventional cable TV channels.

In accordance with the present invention, there is also produced at the head end and transmitted to the subscriber sites an additional signal which has some distinctive characteristics. First, it does not represent conventional TV picture information. Rather, it represents data required for performing the additional, relatively unconventional functionalities which the invention is capable of providing.

The equipment at the subscriber sites is adapted to utilize this data from the head end, under the control of the respective subscriber, so as to provide to the subscriber the particular functionality which the subscriber selects at any given time.

The invention contemplates a wide range of such functionalities.

For example, the system according to the present invention can enable the subscriber to do a great deal of shopping via the TV receiver. This is done by displaying on the receiver specific merchandise available for purchase, as well as its prices, delivery status, etc. These displays can be in the form of the equivalent of catalog pages, or in the form of TV images of merchandise inside a store. Even images of moving around among the merchandise can be provided.

Another, comparable functionality can be provided with respect to the selection and subsequent purchase of tickets of various kinds, such as tickets to sports events, other kinds of performances, transportation media, etc.

Numerous specialized types of information can also be made available to the subscriber by the signal from the head end, such as weather reports, news, TV guide material, etc.

To make the desired choice of TV set presentation, the subscriber interacts with the equipment at the subscriber's own site as more fully described herewith. To then place orders while in the shopping mode, for example, the subscriber uses a conventional telephone line which leads to the order fulfillment facility (store, warehouse, central sales facility, ticket office, etc.) either directly or via the head end which is then being used as a conduit to the relevant fulfillment facilities.

Confirmation of orders is again transmitted to the subscriber site from the head end, and all pertinent financial transactions (purchase authorization, credit checks, funds transfer, etc) are also handled by the system.

Interactive television systems with functionalities such as mentioned above have previously been proposed. However, these prior proposals typically involved accumulating and maintaining at the head end of the system all the information which might be desired from time to time by the various subscribers, including, for example, the contents of a merchandise catalog. From this, the requesting subscriber might then make a selection and place an order using the same transmission channel in reverse.

In order to serve even relatively small numbers of subscribers in this way, there would be generated "traffic" flows so massive as to require new, and extremely costly transmission infrastructure. The situation would be further aggravated by the need to discriminate between the requests from different subscribers and transmit these different requests specifically to the requesting site.

The present invention deals with this situation by utilizing a different conceptual approach to the overall system, which can be implemented by existing infrastructure and by currently available technology.

More particularly, in accordance with the present invention, the information which must be provided to the various subscriber sites in order to achieve the desired functionalities is conceptually divided into two major parts and one of those in turn is divided into several minor parts. One of these major parts consists of that information which, provided appropriate auxiliary steps are taken, can be left unchanged over extended periods of time, such as a month or even longer. This category includes, for example, the electronic data corresponding to a retail shopping catalog. Another example would be the data for the seating diagram and event schedule for a sports stadium, theater, or the like. Still another example is an electronic game. This type of what might be called "long-term data" is stored on CD-ROM and this CD-ROM is physically supplied to each subscriber site.

A new set of such data is then provided from time to time, e.g. at monthly intervals, by physically replacing the CD-ROM at the subscriber's site with a new CD-ROM, which now contains the long-term data that will apply until the next replacement.

The other major part of the information needed at the subscriber sites is that which is apt to change during the interval between CD-ROM replacements.

This part may consist, for example, of new items being added, or old items deleted from a retail catalog, or of price changes, announcements of sales, etc. Another example would be variations in the seats which remain available in stadiums or theaters. Still another example would be rapidly changing weather reports and still another would be changes in TV program information.

This second major part of the information is not stored on CD-ROM at the subscriber site, but is transmitted from the head end, to all subscriber sites simultaneously, i.e. in what is sometimes referred to as "broadcast" fashion.

Moreover, various sub-parts of this second major information part are transmitted, not just once, but in recurrent, or recycling fashion.

The number of such recyclings varies with the type of information being provided.

Thus, a change in retail catalog contents may be recycled over and over until the next CD-ROM replacement, when the changed information would be reflected on the new CD-ROM, and therefore no longer needed from the cable head end.

On the other hand, confirmation of an individual shopping transaction would, theoretically, need to be transmitted only once. However, to make sure that it is properly received, this might still be recycled a small number of times.

Likewise, technical instructions for the equipment at the various sites would be broadcast only once, or at most recycled a small number of times.

Each subscriber site is then provided with means for selecting those portions of the recycling information which it is desired to utilize at that site.

Return communications to the head end can be by ordinary telephone lines.

Current, conventional infrastructure suffices to implement the systems according to the present invention.

Assume, for example, that the present invention is implemented in conjunction with a conventional cable TV network. At the head end of such a network, means are provided for transmitting the conventional TV programs in their conventional formats and frequency channels. In accordance with the present invention, there are further provided means for producing a digital data stream which contains all the information described above for transmission to the various subscriber sites. As previously stated, this entails varying numbers of recyclings of different sub-parts of the total information.

Means are also provided, preferably by operating on the signal while still digital, for conforming the bandwidth of this TV-like signal to whatever unused (or unessential) portion of the over-all-network frequency spectrum is available.

At each subscriber site, means are provided for receiving and utilizing the conventional TV signals from the head end. In addition, means are provided for receiving the additional signal from the head end in accordance with the present invention. From this latter signal, there is then selected that information which is desired to be available to the particular site. As previously mentioned, some of this information (e.g. retail catalogs) is available to all sites; other information (e.g. transaction confirmations) are site-specific and identification means are provided at each site for that reason.

Means are further provided for processing these received signals so as to provide, in conjunction with the information stored on CD-ROM if appropriate, the desired functionalities at the various subscriber sites.

The processing is preferably performed with the received signals in digital format.

Also, data compression means have preferably been applied at the head end and matching decompression means are therefore provided at the subscriber sites.

In the preferred embodiments, certain information is stored in electronic keys, one for each subscriber. For example, the subscriber's individual PIN number may be so stored, as well as credit card information, and other information of personal, or financial nature. The electronic key is so constructed that it can be taken from one site to another. Thus the transactions for which its use is needed do not always have to be performed at one specific site, but can be performed by the same subscriber at any subscriber site in the network.

BRIEF DESCRIPTION OF THE DRAWINGS

For further details, reference is made to the discussion which follows, in light of the accompanying drawings wherein.

DETAILED DESCRIPTION OF THE PREFERRED EMBODIMENTS

Figure 1:
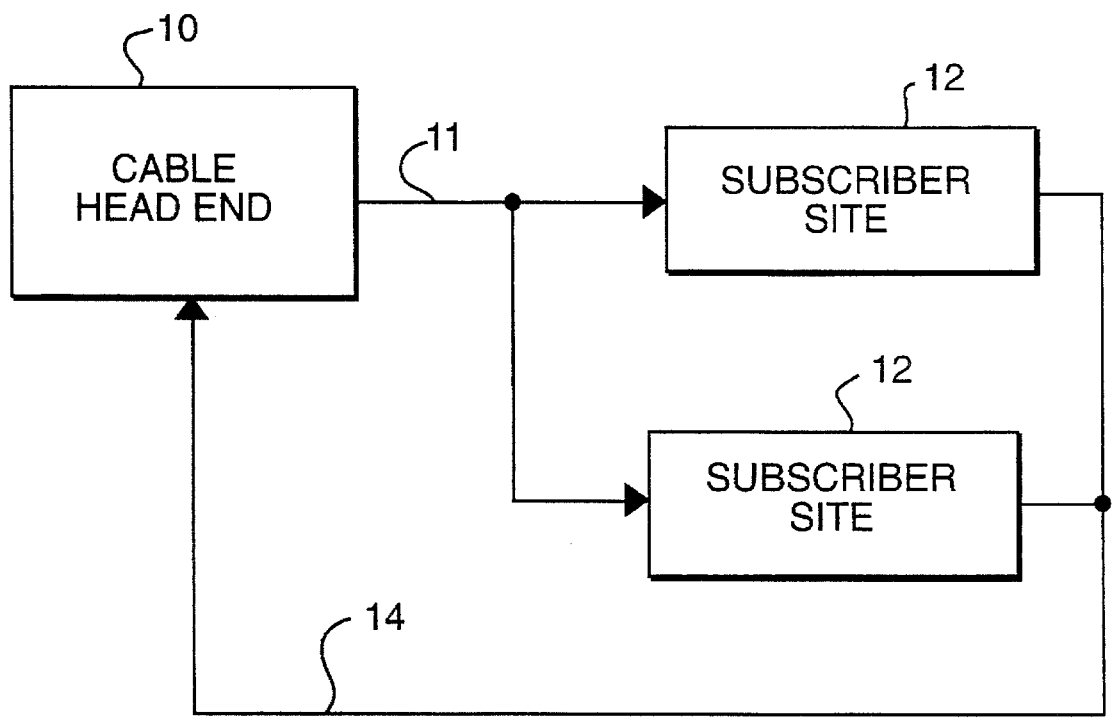
FIG. 1 is a simplified block diagram of the overall system of the invention.

Referring to FIG. 1, this illustrates the system of the invention at its most generalized block diagram level. Thus, FIG. 1 shows the cable network head end equipment 10. The RF output from this equipment is transmitted via cable 11 to a plurality of subscriber sites 12. Only two such sites are illustrated in FIG. 1, but it will be understood that many more such sites will typically form part of the cable system embodying the invention. Certain feedbacks from subscriber sites 12 are returned to the cable head end 10 via connection 14.

In accordance with the invention, at head end 10 there are made available all of the different types of information which one may wish to convey to the various subscriber sites 12.

As previously explained, this information will typically include the full complement of conventional television programs. In addition, it will include information intended for use in the interactive features of the present invention. This includes information relating to commercial transactions which can be carried out by means of the system and which involve feedback from subscriber sites 12 via connection 14 to head end 10. Also included is information which does not pertain to commercial transactions involving such feedback, but which nevertheless is made available to the subscriber sites. This latter kind of information may include newscasts, weather reports, TV program schedule information, etc. Still another kind of information may include E-mail messages directed to subscribers generally, or addressed to one or more selected subscribers specifically. Such addressed messages may also include further information about the above-mentioned commercial transactions, such as confirmation of orders, announcement of shipping dates, etc. Finally there is still another category of such information which might be referred to as "housekeeping" information and which provides instructions to the equipment at the various subscriber sites with respect to changes in mode of operation, software, etc.

One of the features which characterize all of this additional information is that it starts out at head end 10 as digital data but, before reaching cable connection 11, it is transformed into a format which permits the resulting signal to be transmitted within a portion of the overall RF channel limits of the cable system which is either unused or not fully used by the conventional television programming.

The equipment at each subscriber site 12 is capable of receiving all of these transmissions from head end 10 and is, of course, capable of reproducing the conventional television programming provided by these transmissions in conventional manner on a TV set forming part of that equipment.

In addition, in accordance with the present invention, each subscriber site 12 has a data storage means, preferably in the form of CD-ROM, which contains information about the same general subject matter as some of the additional information received at the subscriber sites 12 from the head end 10.

For example, in the CD-ROM at a subscriber site 12, there may be stored information corresponding to that in a merchandise catalog. The transmission from the head end 10 may then provide update information for this catalog, such as additions or deletions of items, price or delivery changes, temporary price reductions, etc.

Jointly, the CD-ROM and the update transmissions from head end 10 enable the subscriber to display the current status of the merchandise on the TV set at the subscriber site 12. If the subscriber desires to act on this information to order an item, this order is communicated to the head end 10 via connection 14. This connection 14 need not be a cable-TV connection. A simple telephone line suffices.

A related feature which characterizes the system of the invention is that most of the additional information is transmitted from head end 10 to the subscriber sites 12 not just once, but repeatedly. For some of the information, this serves the purpose of making sure that it is in fact picked up at the specific site or sites for which it is destined. For other information this gives the subscriber repeated opportunities, sometimes recurring over long periods of time, to exercise the choice of receiving the particular information. In this respect, the present invention is conspicuously different from conventional cable TV systems, in which a subscriber has in practice only one opportunity to select a given program.

In the system embodying the present invention, the following specifics play a major role in providing the features noted above.

One such specific is the cooperation between the storage of information in CD-ROM at the subscriber site 12, and the updating of this information by additional signals from head end 10. What this means is that relatively little information needs to be obtained from the head end to provide an up-to-date reproduction of the complete information. In turn, that means that the complete information can be obtained at any given subscriber site 12 much more quickly than if all of it (including what is on CD-ROM) had to be obtained from the head end 10 at the time it is wanted. The further feature that this update information is repeated, or recycled, means that it is accessible to the subscriber sites 12 repeatedly. The typical duration of a complete cycle of additional information from the head end 10 is only about 10 seconds, as explained more fully hereafter. Thus, any given receiver site 12 which desires to access a particular portion of the update information need wait, at most, about 10 seconds to obtain it, or only about 5 seconds on the average.

Consequently, the subscriber sites 12 have essentially immediate access, at any time, to the complete, fully updated information.

Figure 2:
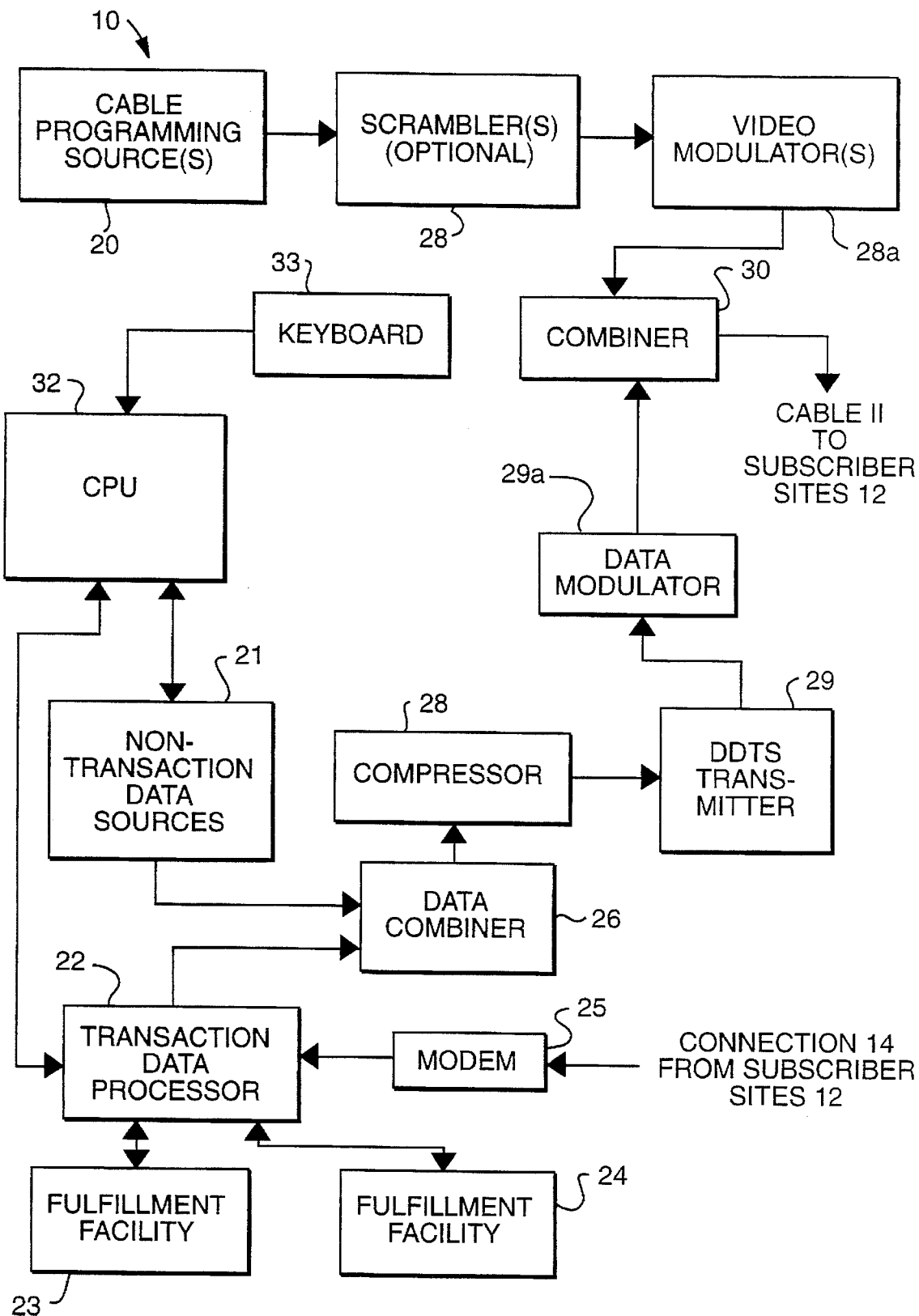
FIG. 2 is a simplified block diagram of the head end of the system in accordance with the invention.

Turning now to FIG. 2, this shows the major components of the head end portion 10 of the system embodying the present invention.

These components of FIG. 2 include a source or sources 20, of conventional cable network programming, a source or sources 21 of those additional data to be supplied to the subscriber sites 12 which do not represent information related to possible commercial transactions to be carried out by means of the system. The head end 10 further includes a processor 22 for additional data which do relate to such commercial transactions. There are shown two so-called fulfillment facilities 23 and 24, which are involved in carrying out the commercial transactions under consideration. There is a modem 25, a data combining circuit 26, a data compressing circuit 27, the transmitter portion 29 of a system for transmitting digital data (DDTS), a combiner circuit 30, a central processor unit (CPU) 32, and a keyboard 33.

Figure 3:
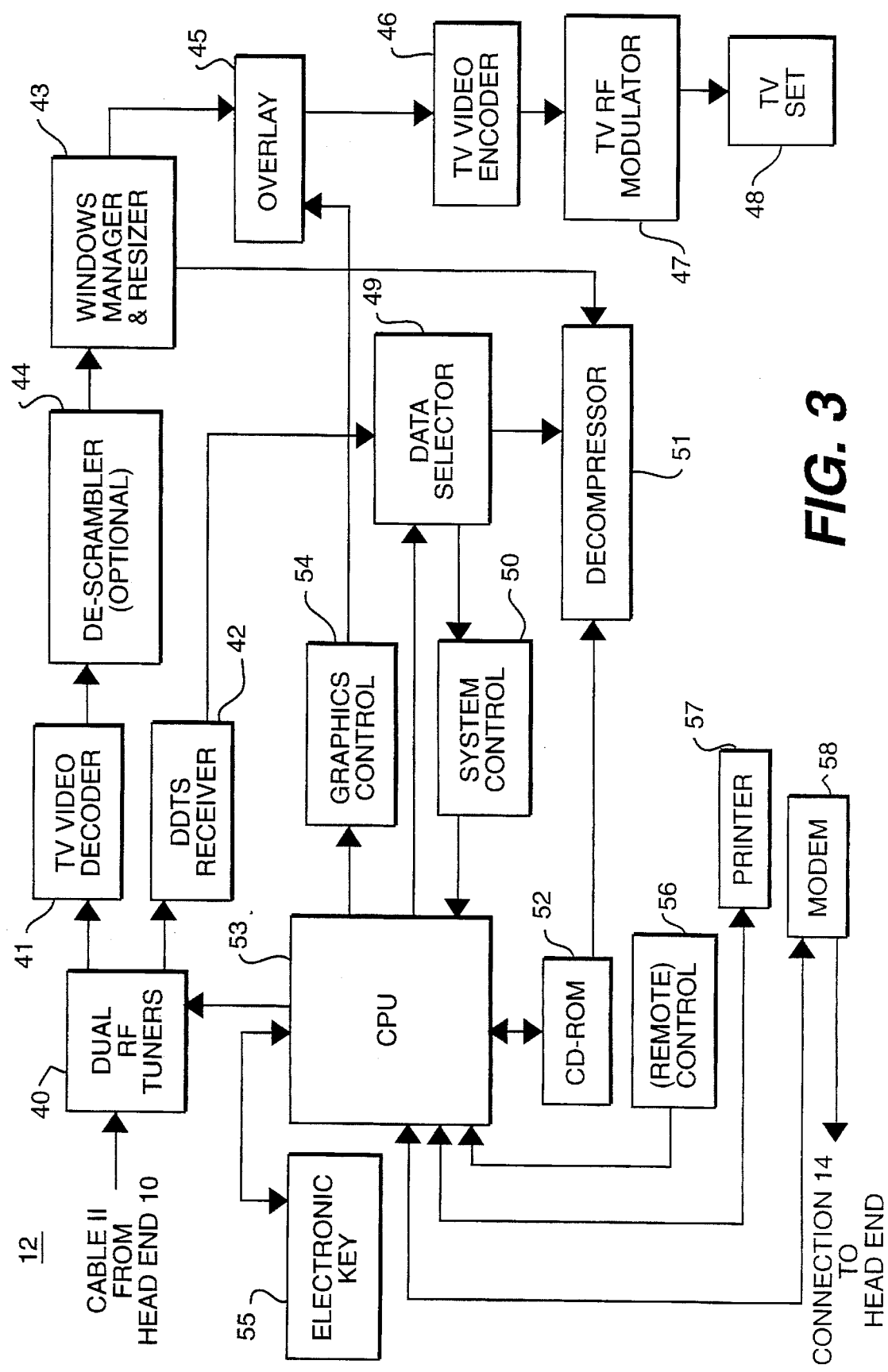
FIG. 3 is a simplified block diagram of a typical subscriber site in accordance with the invention.

Before further discussion of the head end 10 of FIG. 2, reference is made to FIG. 3 which shows the major components of a subscriber site 12 for the overall system embodying the present invention. In this FIG. 3, there are shown dual radio frequency tuner circuits 40, TV video decoder circuits 41, and the receiver portion 42 for the same digital data transmission system (DDTS) for which component 29 in the FIG. 2 represents the transmitter portion. The apparatus of FIG. 3 further includes windows manager and resizing circuitry 43, overlay circuitry 45, TV video encoding circuitry 46, TV radio frequency modulating circuitry 47, and TV set 48. There is also data selector circuitry 49, system control circuitry 50, decompressing circuitry 51, CD-ROM reading package 52, central processor unit (CPU) 53, graphics control circuitry 54, electronic key circuitry 55, remote control 56, printer 57 and modem 58.

The cooperation between the apparatus at head end 10 illustrated in FIG. 2 and the apparatus at subscriber site 12 illustrated in FIG. 3 is such that it will be necessary to go back and forth between these figures in the further description. That is why the contents of each have been identified above before proceeding to describe further how they operate.

Turning now to the operation of the system, we begin with CD-ROM reading package 52 in FIG. 3. Let us assume that, on this CD-ROM, there are stored the digital data corresponding to three typical types of information. One type is that contained in the merchandise catalog of a typical mail order establishment. The second type is that contained in a seating diagram for a sports arena or other performance space, together with event schedule information and seat pricing. The third type is the information for playing a typical video game. All three types are preferably current as of the time that the CD-ROM had this information stored in it. Moreover this digital data is preferably stored in CD-ROM 52 in compressed-signal form.

At any desired time, under the control of CPU 53 activated by remote control 56, any of these three types of information can be read from this CD-ROM 52, decompressed in circuitry 51, passed through windows manager and resizing circuit 43 and overlay circuitry 45, from there to TV video encoder circuitry 46 where it is transformed into the conventional analog TV signal format, and finally through TV RF modulating circuitry 47 to TV set 48, where it would be reproduced as a television reproduction of the information in CD-ROM 52.

However, after CD-ROM 52 was made, there may have been changes in the merchandise catalog information, or in the seating information, initially stored in CD-ROM 52. Therefore, if nothing further were done, the reproduction on TV set 48 of the data from CD-ROM 52 would no longer represent the current situation. As explained more fully hereafter, this dealt with is remedied in accordance with the present invention.

Turning now to the head end 10 (FIG. 2), cable programming source or sources 20 represent the conventional sources of TV program signals available in cable television networks. These conventional signals, in their respective conventional RF channels, are supplied to cable 11 and through cable 11 ultimately reach subscriber site 12 (FIG. 3). This aspect of the overall system is entirely conventional.

These conventional transmissions are not the only ones which are applied to cable 11. Rather, through combining circuitry 30 which is interposed between the cable programming source 20 and cable 11, there are transmitted additional signals in accordance with the present invention. These start out as digital data from either transaction data processor 22, or non-transaction data source 21. Typical data from source 21 are ones which represent newscasts, weather reports, TV programming schedules, etc. On the other hand, typical data from transaction data processor 22 represent changes, or updates in the merchandise catalog information, or in seating information stored in CD-ROM 52 at subscriber site 12 (FIG. 3). These update data, in turn, are supplied to transaction data processor 22 from fulfillment facilities 23 and 24, respectively. One of these corresponds to the establishment which handles merchandise transactions. The other corresponds to the establishment which handles ticket transactions. Each generates the updates in question and transmits them to data processor 22.

The data representing these updates from processor 22 and the other data from data source 21 are supplied to data combiner 26, where they form a digital data stream containing both types of information. This data stream is then preferably supplied to conventional signal compression circuitry 27 and from there to the DDTS transmitter 29. This transmitter 29 transforms the digital data stream which it receives into a signal which is of the same overall format as the conventional analog TV signals used in the cable TV systems. Preferably, this DDTS transmitter 29 takes the form of the transmitter portion of the digital data transmission system which is the subject of another U.S. patent application filed concurrently herewith. This other patent application (Ser. No. 08/223,591) names as the inventor Juan De La Cierva Sr., is entitled Digital Data Transmission System, and is assigned to the same assignee as the present invention. The contents of that other De La Cierva application are incorporated in the present application by reference as fully as though set forth at length herein.

As explained in that referenced .patent application, DDTS transmitter 29 is capable of fitting the transmitted data, for transmission, into a bandwidth which can be as wide as one full TV channel. Alternatively, if a channel of full bandwidth is not available, it can also fit the data into a channel of reduced bandwidth, e.g. of only 4 MHz, or even less. This enables the system to exploit portions of the cable network's RF frequency spectrum which are not used, or which are not used to full capacity for conventional cable TV programming.

Of course, other modulation schemes could also be used.

Through the operation of combining circuitry 30, these signals from DDTS transmitter 29 then become part of the signal structure which is transmitted over cable 11.

At the subscriber site 12, the signals described above received from head end 10 over cable 11 are initially supplied to dual RF tuners 40 (FIG. 3). The reason why there are dual tuners, rather than the conventional single tuner, is that, as previously explained, two distinct types of information are being received and are to be available for simultaneous processing at the subscriber site. One type is that which represents the conventional TV programs, and one of the dual tuners 40 is dedicated to tuning in that particular signal and reducing is to base band for further processing.

The other type represents the additional information being supplied in accordance with the present invention, as described with reference to head end 10 (FIG. 2). As previously explained, this second type of information is transmitted and therefore reaches the subscriber site 12 at a location in the RF spectrum which is different from those in which the conventional programming is provided. It is to tune in this additional signal and reduce it to baseband that the second of the dual RF tuners 40 is provided.

The conventional TV program signals from the corresponding RF tuner 40 are supplied to TV video decoder 41. Its purpose, and the path which these signals follow from video decoder 41 through to TV set 48, has previously been explained in connection with the discussion of CD-ROM 52. That discussion is therefore not repeated here.

As for the other one of dual RF tuners 40, namely that which recovers the additional data received from head end 10 in accordance with the invention, its output is supplied to DDTS receiver circuitry 42, which performs upon it essentially the inverse operation of that performed by DDTS transmitter 29 at head end 10. In other words, DDTS receiver 42, retransforms the digital data from DDTS transmitter 29 back into their original digital format. For details see the above-referenced co-filed application of Juan De La Cierva.

The resulting descrambled digital data are supplied to data selecting circuitry 49 of subscriber site 12.

Thus there exists at the input to this data selector circuitry 49 the equivalent of the digital data stream produced at the output of data combining circuit 26 of head end 10. It will be recalled that this data stream includes update information concerning potential commercial transactions involving fulfillment facilities 23 and 24, and that this update information complements the information concerning these same potential transactions which is prestored in CD-ROM 52 at subscriber site 12.

It will also be recalled that this data stream contains information which does not specifically relate to potential commercial transactions, but rather provides information such as news, weather reports, TV programming schedules, etc.

Before proceeding, it should be noted that, in addition to all of the above-discussed types of information, the data stream from data source or sources 21, under the control of CPU 32, also provides instructions or commands which affect the internal operation of subscriber site 12. All of this data is what appears at the input to data selector 49 (FIG. 3).

In accordance with the present invention, remote control 56, through CPU 53, enables the subscriber to make an initial determination whether TV set 48 is to be supplied with conventional cable programming, or with information based on the combination of digital data from CD-ROM 52 and head end 10.

The signal path which is followed at the subscriber site 12 when conventional cable programming is chosen has previously been described.

When digital data are chosen, remote control 56, via CPU 53, further enables the subscriber to cause data selector 49 to download selected portions of these digital data provided from head end 10 in accordance with the present invention. If these additional data do not represent updates of information previously stored in CD-ROM 52, then they are simply supplied to decompressor 51 where they are restored to their initial, decompressed format. They then pass through windows manager and resizer 43, and overlay circuitry 45, where they may be further "manipulated" with respect to those characteristics which will cause them to have a particular shape, size, and graphics when ultimately displayed on TV set 48. This would be the case, for example, for newscasts, weather reports, TV programming schedules, etc. For this type of information, there is typically no information prestored in CD-ROM 52. Rather, all the necessary information is conveyed by the data transmitted from head end 10 to subscriber site 12.

On the other hand, if the information arriving from the head end pertains to the particular type of information which is stored in CD-ROM 52, and is actually intended to update that stored information, then the arriving information will be used to modify the related information stored in CD-ROM 52. In that case, information from CD-ROM 52, as modified is Supplied if appropriate via decompressor 51 and from there in combined form to windows manager and resizer 43 and overlay circuitry 45. From there it is ultimately reproduced on TV set 48.

In addition, there is derived from data selector 49 whatever information is needed to control the operation of the subscriber site with respect to, for example, changes in software. This takes place via system control circuitry 50 which supplies such control information to CPU 53.

Assume, as before, that, at head end 10 (FIG. 2) there is a fulfillment facility 23 which corresponds to a mail order establishment. The catalog information for this establishment has been stored in CD-ROM 52, at subscriber site 12. Information concerning the merchandise available from fulfillment facility 23, which varies between replacements of the CD-ROM 52, is present in the data stream transmitted from head end 10 to subscriber site 12.

When the subscriber at site 12 selects the information from this mail order establishment, its catalog information, as updated from head end 10, is reproduced on TV set 48 at subscriber site 12.

Using remote control 56 and conventional menu type presentations on TV set 48, the subscriber is now able to select for viewing on that TV set those portions of the catalog information and related updates which are of interest to that subscriber.

If the subscriber desires to place an order as a result of such viewing, this is accomplished by means of modem 58 which, again under control of remote control 56 and CPU 53, transmits the order via telephone line 14 to head end 10. It should be noted that such telephone order placement also preferably takes place automatically in response to operation of remote control 56, based on a menu of possible actions displayed on TV set 48.

At head end 10, the communication from modem 58 at subscriber site 12 is received by modem 25 (FIG. 2). From there it is supplied to transaction data processor 22 which, in turn, transmits the order to the appropriate fulfillment facility, namely facility 23 in this instance.

Note also that only a short telephone message is needed and that the telephone line can be disconnected thereafter.

The fulfillment facility responds by providing an order confirmation plus any appropriate accompanying data, such as delivery information and the like, back through transaction data processor 22 and via the data stream through RF circuits 31 and cable 11 to subscriber site 12.

When received at subscriber site 12, this return information is automatically selected by data selector 49 and displayed on TV set 48, and/or in printed form by printer 57. In this way, feedback about the transaction is provided to the subscriber site 12 (FIG. 3).

Automatic presentation of this confirmation information is accomplished because the signals from head end 10 which convey this information are accompanied by the specific address of the particular subscriber site 12. This address also accompanied the order when it was originally transmitted via modems 58 and 25.

Since such a transaction normally involves not only order placement and confirmation but also its financial aspects, there is also provided, in conjunction with placement of the order, information about the identity of the subscriber placing the order, such as credit card number, PIN number, etc. This information is utilized at the fulfillment facility 23 to obtain payment, e.g. by debiting the subscriber's credit card account. If the credit card transaction requires the participation of a bank or other credit card facility, that is accomplished by appropriate interconnection with such a facility (not shown) either from transaction data processor 22, or from fulfillment facility 23 itself.

The necessary subscriber identity information, as well as related credit and payment information, is preferably prestored in electronic key 55 (FIG. 3) which uniquely identifies that particular subscriber with respect to these characteristics. This key 55 has to be connected to subscriber site 12 in order for all of the operations described previously to be consummated. Preferably, this connection is made in detachable form, so that the electronic key 55 can be attached to any one of the various subscriber sites, and there be used by one and the same subscriber in the manner previously described.

Instead of merchandise, a subscriber may wish to deal with tickets to a sporting event. In that case, there is read from CD-ROM 52 the information stored therein concerning seating for this particular event. This is combined with update information concerning the same subject from data selector 49. The latter provides the current availability status, whereas the former provides, say, the basic seating plan, standard ticket prices, and other information of a relatively constant nature, such as reservation time limits, refund policies, etc. All of this information is then presented on TV set 48.

If the subscriber desires to then make reservations or purchase tickets, that is accomplished (as before) by transmission of the order via modems 58 and 25 to transaction data processor 22 and from there to fulfillment facility 24, which in this case would be a ticket distribution establishment.

Facility 24, in turn, provides confirmation of the transaction, addressed to the specific subscriber site 12 from which the order originated, and there reproduced on the TV set 48 and/or by means of printer 57.

In the case of printer 57, the printout would be a confirmation of the reservation which can be exchanged for the actual tickets in due course. Alternatively, it might even be the tickets themselves.

To that end, the printer is preferably of the kind disclosed in the co-pending U.S. patent application of Donald E. Rhoades and John Spaulding, Ser. No. 08/059,676, filed May 12, 1993, and assigned to the assignee of the present invention. The contents of this co-pending application are incorporated in the present application by reference as if set forth in full herein.

Of course, the same type of printer arrangements may also be used to provide a print-out of order confirmation in the case of a transaction with merchandise facility 23 (FIG. 2).

As previously pointed out, CD-ROM 52 remains in place at subscriber site 12 for a period of time which is consistent with the ability of the overall system to accommodate changes in the information stored in that CD-ROM by means of the updating technique described above. In practice, this period of time may be of the order of a month's duration, or even longer, provided the updating technique has sufficient capacity to accommodate all the changes which may take place in the interim.

At the end of that period, the particular CD-ROM 52 is physically replaced by another CD-ROM, which then contains that information which is appropriate for such CD-ROM storage until the next CD-ROM replacement.

It is a feature of the present invention that the capacity of the system to provide the necessary updates is highly "elastic" and can efficiently accommodate an exceptionally wide range of update requirements.

For a given transmission bandwidth available for the update signals, there is normally an upper limit for the data rate (bits per second) which can be conveyed within that bandwidth. Assume that this data rate is 20 Mbps, based on a bandwidth of 4 MHz and that there is used, for the DDTS transmitter 29 (FIG. 2) and receiver 42 (FIG. 3), the apparatus disclosed in the above- referenced co-filed patent application of Juan De La Cierva entitled Digital Data Transmission System.

Assume further that the contents of the update information at one particular time are such that a digital data stream of 20 MB is required to transmit all of it once. With these assumptions, the time required for such complete one-time transmission will be approximately 10 seconds, taking into account the need for additional header-type identifiers, addresses, parity checks, and other "housekeeping" data.

At some later time, the contents of the update information will have changed. Such a change may result, for example, from the addition of information about special pricing of merchandise from the mail order establishment symbolized by fulfillment facility 23 (FIG. 2). Due to this additional information, the data stream required to transmit all the information once will now be longer than 20 MB and the time required for its complete one-time transmission will also have lengthened. Conversely, a reduction in update information content will shorten the data stream length and with it the one-time transmission time.

The system embodying the present invention fully accommodates such variations. It does so by accompanying each item of update information with a header which uniquely identifies it as to what it represents. For example, a portion of the data stream corresponding to an update in merchandise catalog information would have a header which the subscriber site is programmed to recognize as such, and to process accordingly. Thus, regardless of where in a complete one-time transmission this particular information is provided to the subscriber sites, and regardless of how long or how short the time may be which is required for the one-time transmission of all the update information, the desired portions of this information can always be selected.

In referring to "updates" in this context, there are meant all the different portions of the transmitted data, whether these represent modifications to information which is stored in CD-ROM at subscriber sites, or whether they represent other information such as newscasts, weather reports, etc., or transaction confirmations, as well as system control data not intended to be reproduced for the subscriber.

The appropriate identifying headers for the different information portions are attached to these portions at the head end. They may be provided either by the respective information services, such as fulfillment facilities, or by preprogramming of the head end CPU 32 (FIG. 2).

This same technique of individually identifying the different portions of the transmitted data also cooperates with that feature of the invention which involves transmitting most individual portions of data not only once, but repeatedly, during successive one-time transmissions of the entire information contents.

For example, a change in the price of an item of catalog merchandise, from that which is stored in CD-ROM at the subscriber sites, may be intended to be temporary, lasting only for a day or two as a special promotion. The present invention transmits the data representing this change, over and over, within each consecutive one-time transmission of the complete set of data contents. This repeated transmission continues until the end of the one or two day period, during which the special price is in effect. At the end of that period, this item is dropped from the data stream.

During that period, every subscriber site can access the information once during each repetition.

As previously explained, successive repetitions are only a few seconds apart. Therefore there is very little delay in obtaining the desired portion of the transmitted information.

Moreover, the subscriber sites are preferably programmed so that, once the selection has been made of a particular data portion for reproduction, then all other related portions are also downloaded and stored in temporary memory at the subscriber site. From there, they can be selectively recalled and utilized without even incurring the few seconds delay which might otherwise take place.

Whether a particular item of information is or is not included in any given one-time transmission of a complete set of data is determined by the source of that particular information item.

For example, for merchandise catalog updates, such inclusion or non-inclusion would be determined by fulfillment facility 23; for seating arrangement updates by fulfillment facility 24; for newscasts by their source, etc. For system instructions and commands, this would be determined by CPU 32 (FIG. 2) protocols, or by keyboard 33 entry.

The following is also noted.

It will be understood that audio typically accompanies the video content of the information in the system of the invention. This audio is processed in conventional manner, so as to be reproduced on TV set together with the video to which it pertains.

If it is deemed appropriate to provide for scrambling of certain TV channels, in order to prevent their unauthorized viewing, there may be included in the system scrambler 28 (FIG. 2) and descrambler 44 (FIG. 3). For that purpose, there may be used scrambling and descrambling equipment such as disclosed in still another U.S. Patent application of Juan De La Cierva, which is being filed simultaneously herewith (Ser. No. 08/223,590), which is entitled Dynamic Digital Scrambling System, and which is assigned to the same assignee as the present invention. This other co-filed application is incorporated in the present application by reference as fully as if set forth at length herein.

Although FIG. 2 shows only two fulfillment facilities 23 and 24, it will be understood that a greater number and greater variety of such fulfillment facilities may be included in the system according to the present invention.

Also a fulfillment facility need not be physically co-located with the remainder of head end 10 of the system, but may be located elsewhere and electronically connected to head end 10. Likewise, transaction data processor 22 may be located away from the physical location of head end 10 and electronically connected to it and to the various fulfillment facilities.

Previously in this application, there has been made mention of storage in CD-ROM 52 (FIG. 3) not only of merchandise and seating information but also game playing information. Such game playing information may in some circumstances be self-contained so that the entire game can be played using that CD-ROM information without resort to any additional data from head end 10. In such case, remote control 56 (FIG. 3), via CPU 53, causes the game information to be read from CD-ROM 52 and ultimately displayed on TV set 48 without any supplementation by information from data selector 49.

On the other hand, if additional information from head end 10 is appropriate for use in conjunction with the game information stored in CD-ROM 52, then this becomes an additional portion of the data stream from the head end.

It will also be understood that the stored information at each subscriber site 12 need not all be contained in a single CD-ROM. Rather, one CD-ROM may be dedicated to merchandise catalog information, another to game information, etc. The subscriber can then select the one to insert in the CD-ROM reader, depending on which functionality it is desired to utilize.

Circuitry such as windows manager and resizer 43 and overlay 45 are well known in modern TV technology and are utilized in accordance with the invention in their conventional manner. Specifically, windows manager and resizer 43 provides the capability at subscriber site 12 to superimpose different images upon each other and to vary their respective sizes as ultimately seen on TV set 48. Overlay circuitry 45 operates on these signals to produce various graphic effects as determined by graphics control circuitry 54, based on programming stored in CPU 53 and as activated by remote control 56.

The invention has been described with specific reference to adding its features to a conventional cable TV network. However, it will be understood that such cooperation is not indispensable. If warranted, the present invention could be embodied in a separate network, for handling only the data which characterize the invention, and without any conventional cable TV programming.

Structurally, this would mean that the head end 10 would no longer have cable programming sources 20, scrambler 28, video modulator 28a and combiner 30. Subscriber sites 12 would have only a single RF tuner, rather than dual RF tuners 40, no TV decoder 41, and no descrambler 44.

Also, it is not essential that cable be used for networking. Direct satellite broadcasts could also be used, or terrestrial broadcast, or other signal distribution techniques as these may be developed.

In view of these, and other modifications which will occur to those skilled in the art, it is desired that the scope of the invention be defined only by the appended claims.

What is claimed is:

1. A television system terminal for use at a remote location, comprising:

a memory device for storing long-term static service data relating to one or more interactive services;

a data receiver for receiving a stream of dynamic service data recurrently broadcast from a central location, the dynamic service data relating to the one or more interactive services;

control circuitry, responsive to a user command for selecting one of the one or more interactive services, for reading the long-term static service data corresponding to the selected interactive service from said memory device, for selecting a portion of the dynamic service data corresponding to the selected interactive service from the data receiver, and for combining the read long-term static service data and the selected dynamic service data to produce a composite data service display signal.

2. The television system terminal according to claim 1, further comprising a television receiver for receiving television signals for display.

3. The television system terminal according to claim 2, wherein said data receiver comprises a first tuner for tuning to a data signal channel and a data receiver for recovering the dynamic service data carded on the data signal channel, and said television receiver comprises a second tuner for tuning to a television signal channel and a television decoder.

4. The television system terminal according to claim 1, wherein the long-term static service data includes compressed long-term static service data and further comprising a decompressor for decompressing the compressed long-term static service data.

5. The television system terminal according to claim 1, wherein at least a portion of the memory device comprises a read-only memory.

6. The television system terminal according to claim 1, wherein the memory device comprises a CD-ROM.

7. The television system terminal according to claim 1, further comprising a data transmitter for transmitting user transaction data for initiating an interactive transaction in response to a display of the composite data service display signal.

8. The television system terminal according to claim 7, wherein said data receiver further receives addressed confirmation data transmitted from the central location for confirming the transaction.

9. The television system according to claim 8, wherein the dynamic service data comprises a price update of merchandise included in the merchandise catalog data.

10. The television system according to claim 7, wherein the long-term static service data comprises data defining a merchandise catalog.

11. The television system according to claim 10, wherein the dynamic service data comprises an update of merchandise included in the merchandise catalog data.

12. The television system according to claim 10, wherein the dynamic service data comprises an update of availability of merchandise included in the merchandise catalog data.

13. The television system according to claim 12, wherein the dynamic service data comprises data defining current seating availability.

14. The television system according to claim 7, wherein the long-term static service data comprises data defining a public event including an event seating diagram and an event schedule.

15. The television system according to claim 7, wherein the long-term static service data comprises data defining a video game.

16. A television system comprising a headend, subscriber terminals at respective subscriber sites remote from the headend, and a transmission medium for coupling the headend to the subscriber terminals, said headend comprising a transmitter for transmitting television signals to the subscriber terminals and for recurrently transmitting a stream of dynamic service data to the subscriber terminals, the dynamic service data relating to one or more interactive services; and at least one of said subscriber terminals comprising:

a receiver for receiving the transmitted television signals and for receiving the recurrently transmitted dynamic service data stream;

a memory device for storing long-term static service data relating to the one or more interactive services;

a controller, responsive to a selection of one of the interactive services by a subscriber, for combining the long-term static service data corresponding to the selected interactive service from said memory device and the dynamic service data corresponding to the selected interactive service from said receiver to produce a composite data service display signal.

17. The television system according to claim 16, wherein said at least one subscriber terminal further comprises a data transmitter for transmitting data corresponding to a transaction selected by the subscriber in response to a display of the composite data service display signal, thereby enabling the subscriber to initiate an interactive transaction.

18. The television system according to claim 17, further comprising a processor for processing the data corresponding to the transaction selected by the subscriber, and wherein the transmitter further transmits a confirmation signal addressed to the subscriber for confirming the interactive transaction.

19. The television system according to claim 17, wherein the long-term static service data comprises data defining a merchandise catalog.

20. The television system according to claim 19, wherein the dynamic service data comprises a price update of merchandise included in the merchandise catalog data.

21. The television system according to claim 19, wherein the dynamic service data comprises an update of merchandise included in the merchandise catalog data.

22. The television system according to claim 19, wherein the dynamic service data comprises an update of availability of merchandise included in the merchandise catalog.

23. The television system according to claim 17, wherein the long-term static service data comprises data defining a public event including an event seating diagram and an event schedule.

24. The television system according to claim 23, wherein the dynamic service data comprises data defining current seating availability.

25. The television system according to claim 17, wherein the long-term static service data comprises data defining a video game.

26. The television system according to claim 17, wherein said data transmitter comprises a modem.

27. The television system according to claim 17, wherein said at least one subscriber terminal further comprises a remote control for entering at least a portion of the data corresponding to the transaction selected by the subscriber.

28. The television system according to claim 27, wherein said at least one subscriber terminal further comprises an electronic key device for entering a portion of the data corresponding to the transaction selected by the subscriber.

29. The television system according to claim 27, wherein at least a portion of said memory device comprises a read-only memory.

30. The television system according to claim 27, wherein said memory device comprises a CD-ROM.

31. The television system according to claim 27, wherein said memory device comprises a CD-ROM.

32. The television system according to claim 16, wherein said receiver comprises a first tuner for tuning to a selected one of a plurality of television channels carrying the transmitted television signals, a television video decoder for recovering the television signals carried on the selected television channel, a second tuner for tuning to a selected one of at least one data channel carrying the transmitted dynamic service data corresponding to the selected interactive service, and a data receiver for recovering the dynamic service data carried on the selected data channel.

33. The television system according to claim 16, wherein at least a portion of said memory device comprises read-only memory.

\* \* \* \* \*